(12) United States Patent
Kimura

(10) Patent No.: US 10,361,524 B2
(45) Date of Patent: Jul. 23, 2019

(54) INTERFACE COMPATIBLE WITH MULTIPLE INTERFACE STANDARDS

(71) Applicant: TOSHIBA MEMORY CORPORATION, Tokyo (JP)

(72) Inventor: Naoki Kimura, Ebina Kanagawa (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 158 days.

(21) Appl. No.: 15/421,700

(22) Filed: Feb. 1, 2017

(65) Prior Publication Data

US 2017/0264060 A1  Sep. 14, 2017

(30) Foreign Application Priority Data

Mar. 11, 2016 (JP) ................. 2016-048429

(51) Int. Cl.
  *H01R 27/00* (2006.01)
  *G06F 13/42* (2006.01)
  *H01R 13/703* (2006.01)

(52) U.S. Cl.
  CPC ......... *H01R 27/00* (2013.01); *G06F 13/4282* (2013.01); *H01R 13/7039* (2013.01); *H01R 2201/06* (2013.01)

(58) Field of Classification Search
  None
  See application file for complete search history.

(56) References Cited

U.S. PATENT DOCUMENTS

| 8,188,615 B2 | 5/2012 | Du et al. |
| 8,244,940 B2 | 8/2012 | Ishii et al. |
| 9,432,298 B1 * | 8/2016 | Smith ................. H04L 49/9057 |

(Continued)

FOREIGN PATENT DOCUMENTS

| JP | 2003162381 A | 6/2003 |
| JP | 2013-505600 A | 2/2013 |

OTHER PUBLICATIONS

Japanese Office Action filed Oct. 9, 2018, in counterpart Japanese Patent Application No. 2016-048429, 11 pages (includes Machine translation).

(Continued)

*Primary Examiner* — Henry Tsai
*Assistant Examiner* — Aurangzeb Hassan
(74) *Attorney, Agent, or Firm* — Kim & Stewart LLP

(57) ABSTRACT

An interface includes a connector that is physically and electrically connectable to a device conforming to a first interface standard and a device conforming to a second interface standard, and an interface circuit including a signal line extending to a terminal of the connector, a coupling capacitor disposed on the signal line, and a switch having a first end electrically connected to a first terminal of the coupling capacitor and a second end electrically connected to a second terminal of the coupling capacitor. The switch is turned on when the connector is connected to a device conforming to the first interface standard so that a signal bypasses the coupling capacitor and is transmitted through the switch and turned off when the connector is connected to a device conforming to the second interface standard so that the signal is transmitted through the coupling capacitor.

20 Claims, 7 Drawing Sheets

(56) References Cited

U.S. PATENT DOCUMENTS

| | | | |
|---|---|---|---|
| 2003/0185308 A1* | 10/2003 | Schoenborn | G06F 13/4077 |
| | | | 375/257 |
| 2003/0229748 A1* | 12/2003 | Brewer | G06F 13/385 |
| | | | 710/305 |
| 2007/0115954 A1* | 5/2007 | Wu | G06F 13/4072 |
| | | | 370/359 |
| 2008/0282075 A1 | 11/2008 | Hsu et al. | |
| 2013/0187699 A1* | 7/2013 | Slezak | H03K 19/017509 |
| | | | 327/333 |
| 2013/0294023 A1 | 11/2013 | Gay | |
| 2014/0232464 A1* | 8/2014 | Song | H04L 27/01 |
| | | | 330/258 |
| 2014/0372666 A1 | 12/2014 | Moioli et al. | |
| 2017/0109098 A1* | 4/2017 | Nakata | G06F 3/0604 |
| 2017/0371823 A1* | 12/2017 | Pearson | G06F 13/4282 |

OTHER PUBLICATIONS

David Money Harris et al., Digital Design and Computer Architecture, 2006 Intel, 14 pages (includes English translation).

* cited by examiner

INTERFACE COMPATIBLE WITH MULTIPLE INTERFACE STANDARDS

CROSS-REFERENCE TO RELATED APPLICATION

This application is based upon and claims the benefit of priority from Japanese Patent Application No. 2016-048429, filed Mar. 11, 2016, the entire contents of which are incorporated herein by reference.

FIELD

Embodiments described herein relate generally to an interface, in particular, an interface compatible with multiple interface standards.

BACKGROUND

A host apparatus, such as a personal computer, includes a connector to which a device, such as a solid state drive (SSD), may be connected. It is desirable that the host apparatus is compatible with devices of a plurality of different interface standards.

DETAILED DESCRIPTION

An embodiment provides a host apparatus capable of compatible with a plurality of different interface standards.

In general, according to an embodiment, an interface includes a connector that is physically and electrically connectable to a device conforming to a first interface standard and a device conforming to a second interface standard, and an interface circuit including a signal line extending to a terminal of the connector, a coupling capacitor disposed on the signal line, and a switch having a first end electrically connected to a first terminal of the coupling capacitor and a second end electrically connected to a second terminal of the coupling capacitor. The switch is turned on when the connector is connected to a device conforming to the first interface standard so that a signal bypasses the coupling capacitor and is transmitted through the switch and turned off when the connector is connected to a device conforming to the second interface standard so that the signal is transmitted through the coupling capacitor.

Hereinafter, a host apparatus according to an embodiment will be described in detail with reference to the accompanying drawings. However, the disclosure should not be construed to be limited by this embodiment.

Embodiment

Figure 1:
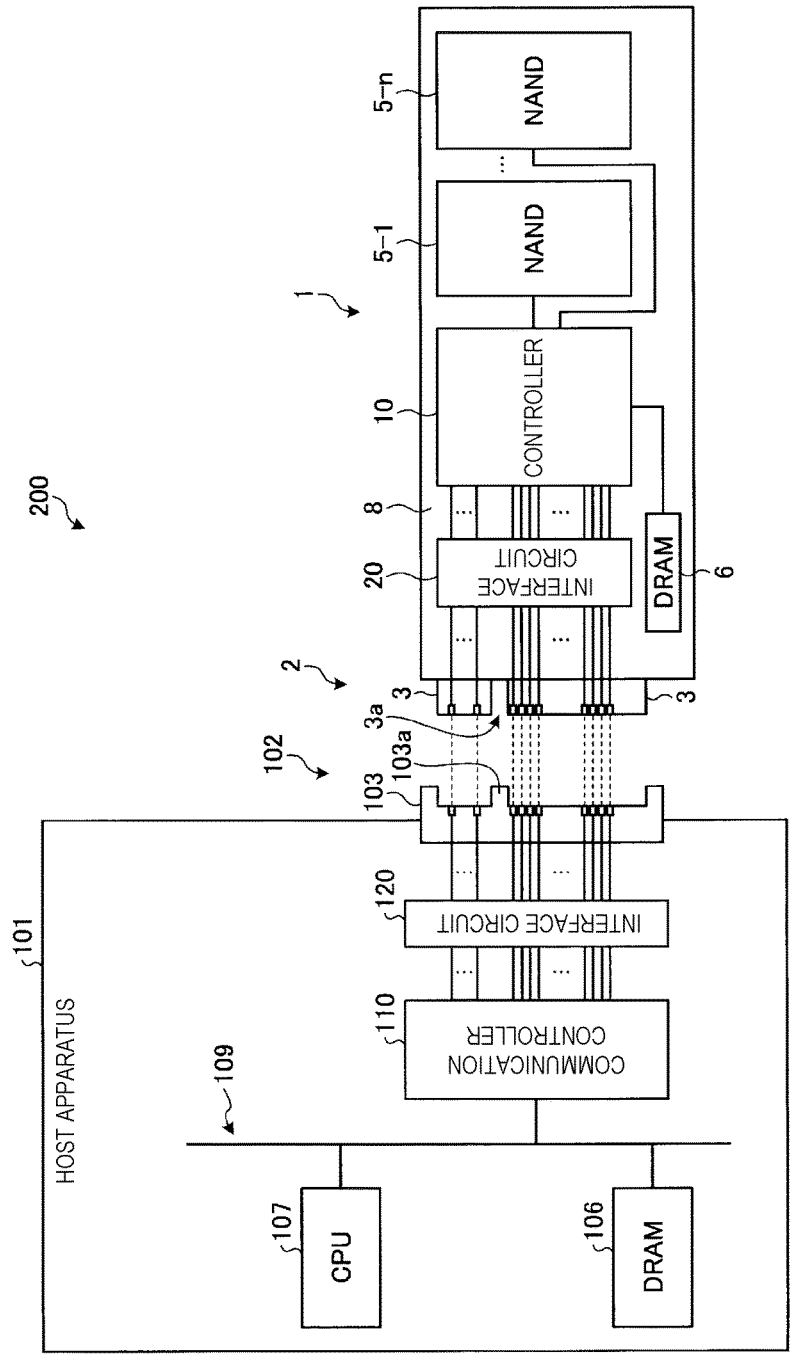
FIG. 1 illustrates a configuration of an information processing system including a host apparatus according to an embodiment.

A host apparatus 101 according to an embodiment is described with reference to FIG. 1.

The host apparatus 101 is included in an information processing system 200. The information processing system 200 includes the host apparatus 101 and a device 1. In the information processing system 200, the host apparatus 101 allows the device 1 to be connected thereto so that the host apparatus 101 and the device 1 are communicable with each other.

The host apparatus 101 can be, for example, an information processing apparatus, such as a personal computer, a mobile phone, or an imaging apparatus, can be a portable terminal, such as a tablet computer or a smartphone, can be a game machine, or can be an in-car terminal, such as a car navigation system.

The device 1 is, for example, a memory device, such as a solid state drive (SSD), and can function as an external storage for the host apparatus 101. The device 1 according to the embodiment is, for example, a relatively small module, and an example of the external dimension thereof is 22 mm×80 mm. Moreover, the size of the device 1 is not limited thereto, and various sizes of the device 1 is applicable to the information processing system 200 of the present embodiment.

The host apparatus 101 includes a connector 102, and the device 1 includes a connector 2. The connector 2 is located at the edge portion of a substrate 8, and is thus configurable as an edge connector 3. The connector 102 is located on a motherboard (not illustrated) or at the edge portion of the host apparatus 101, and is configurable as a socket 103 compatible with the edge connector 3.

Moreover, the host apparatus 101 can be, for example, a server. In this case, the host apparatus 101 includes a plurality of connectors 102 that faces, for example, upward. A plurality of devices 1 is respectively attached to the plurality of connectors 102 of the host apparatus 101, and is supported side by side with each other in approximately a vertical standing position. Such a configuration enables a plurality of devices 1 to be collectively mounted in a compact manner, thus achieving reduction in size of the information processing system 200.

The edge connector 3 of the connector 2 and the socket 103 of the connector 102 have shapes which conform to the standard of Form Factor (for example, the M.2 Form Factor). The edge connector 3 of the connector 2 has a notch 3a formed at a position deviating from the middle position along the transverse direction of the substrate 8. The position at which the notch 3a is formed in the edge connector 3 can be, for example, the position of "M key" in the M.2 Form Factor, such as that illustrated in FIG. 1, or can be the position of "B & M key" in the M.2 Form Factor (not illustrated). The socket 103 of the connector 102 has a projection 103a at a position corresponding to the notch 3a of the edge connector 3.

The notch 3a and the projection 103a fit with each other when the edge connector 3 of the connector 2 is connected to the socket 103 of the connector 102. This allows an intended Form Factor (for example, the M.2 Form Factor) to be selected from among a plurality of types of Form Factors, and allows the connector 2 of the device 1 of an intended type (for example, the type M associated with the "M key" or the type B+M associated with the "B & M key") to be selected from among a plurality of types of connectors conforming to the standard of the intended Form Factor and then connected to the connector 102 of the host apparatus 101. Moreover, this prevents the device 1 from being mounted on the host apparatus 101 the wrong way around in front and back sides.

The edge connector 3 of the connector 2 and the socket 103 of the connector 102 each have a plurality of mutually corresponding terminals. For example, the edge connector 3 of the connector 2 has a plurality of pins, and the socket 103 of the connector 102 has a plurality of contacts corresponding to the plurality of pins. When the edge connector 3 of the connector 2 is connected to the socket 103 of the connector 102, the terminals (pins) of the connector 2 contact with and are electrically connected to the corresponding terminals (contacts) of the connector 102. This allows the device 1 to be connected to and communicate with the host apparatus 101.

The host apparatus 101 further includes an interface circuit 120, a communication controller 110, a dynamic random access memory (DRAM) 106, a bus 109, and a central processing unit (CPU) 107. The communication controller 110, the DRAM 106, and the CPU 107 are connected to each other via the bus 109. The CPU 107 controls the units of the host apparatus 101. The DRAM 106 functions as a buffer when a signal (for example, a command or data) is sent to or received from the device 1, and also functions as a work area for the CPU 107.

The device 1 further includes an interface circuit 20, a DRAM 6, a controller 10, and a plurality of NAND-type flash memories (NAND memories) 5-1 to 5-n (n being an integer equal to or greater than 2). The controller 10 controls the units of the device 1. The DRAM 6 functions as a buffer when a signal (for example, a command or data) is sent to or received from the host apparatus 101 or the NAND memories 5-1 to 5-n, and also functions as a work area for the controller 10. The NAND memories 5-1 to 5-n store data in a non-volatile manner. Each of the NAND memories 5-1 to 5-n includes a memory cell array in which a plurality of memory cells is arranged in a matrix manner, and each memory cell can perform, for example, multi-valued storage using a higher-level page and a lower-level page. The NAND memories 5-1 to 5-n include a plurality of memory chips, and the NAND memories 5-1 to 5-n erase data on a block-by-block basis and perform data writing and data reading on a page-by-page basis. Each block includes a plurality of pages.

When the connector 2 of the device 1 is connected to the connector 102 of the host apparatus 101, the communication controller 110 becomes communicable with the controller 10 via the interface circuit 120, the connector 102, the connector 2, and the interface circuit 20 under the control of the CPU 107. The communication controller 110 can transmit, for example, a command or data received from the CPU 107 via the bus 109 to the controller 10 via the interface circuit 120, the connector 102, the connector 2, and the interface circuit 20. The controller 10 writes data in the NAND memories 5-1 to 5-n and reads data from the NAND memories 5-1 to 5-n according to the command using the DRAM 6 as a buffer memory, and, after that, transmits, for example, a response or data to the communication controller 110. The communication controller 110 can receive, for example, a response or data from the controller 10 via the interface circuit 20, the connector 2, the connector 102, and the interface circuit 120, and to transfer, for example, the received response or data to the CPU 107 via the bus 109.

The host apparatus 101 connects to the device 1 according to a predetermined interface standard. Examples of the interface standard include Advanced Technology Attachment (ATA), Serial ATA (SATA), Universal Serial Bus (USB), Serial Attached SCSI (SAS), and Peripheral Components Interconnect Express (PCI Express).

Figure 2:
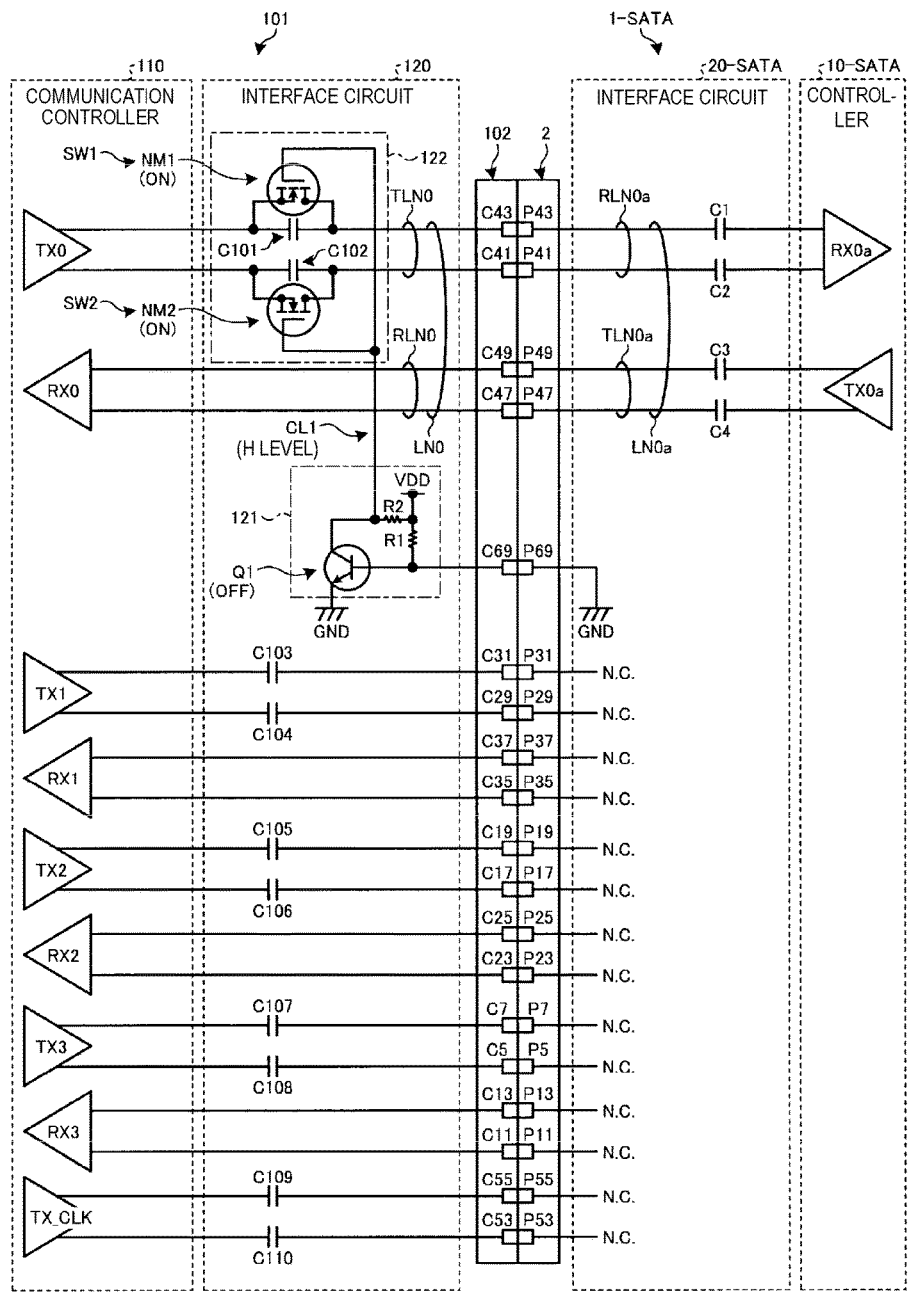
FIG. 2 illustrates configurations of a connector and an interface circuit of the host apparatus according to the embodiment and a connector and an interface circuit of a device when the device is of the SATA type.

FIG. 2 illustrates a device 1 that is connected to the host apparatus 101 and is a device 1-SATA of the SATA type. Specifically, FIG. 2 illustrates configurations of the connector 102 and the interface circuit 120 of the host apparatus 101 and the connector 2 and the interface circuit 20-SATA of the device 1-SATA. The device 1-SATA of the SATA type refers to a device which conforms to the SATA standard or the SATA Express standard, and thus to a device having an interface (a connector and an interface circuit) conforming to the SATA standard or the SATA Express standard.

FIG. 2 illustrates a state in which pins P43, P41, P49, P47, P69, P31, P29, P37, P35, P19, P17, P25, P23, P7, P5, P13, P11, P55, and P53 of the connector 2 of the device 1-SATA are respectively connected to the corresponding contacts C43, C41, C49, C47, C69, C31, C29, C37, C35, C19, C17, C25, C23, C7, C5, C13, C11, C55, and C53 of the connector 102 of the host apparatus 101.

Each of the contacts C43, C41, C49, C47, and C69 functions as a terminal compatible with the SATA standard or the SATA Express standard. For example, the contacts C43 and C41 configure a differential pair at the transmitting side. The contact C43 functions as, for example, a SATA-B minus terminal, which is one of data terminals of the differential pair. The contact C41 functions as, for example, a SATA-B plus terminal, which is the other of data terminals of the differential pair. For example, the contacts C49 and C47 configure a differential pair at the receiving side. The contact C49 functions as, for example, a SATA-A plus terminal, which is one of data terminals of the differential pair. The contact C47 functions as, for example, a SATA-A minus terminal, which is the other of data terminals of the differential pair. For example, the contact C69 functions as a PEDET terminal used to recognize the type of an interface of a device connected to the host apparatus 101. When the device 1-SATA of the SATA type is connected to the host apparatus 101 and the pin P69 of the connector 2 in the interface circuit 20-SATA of the device 1-SATA is connected to the ground potential GND, the potential of the contact C69 becomes the ground potential GND.

On the other hand, when the device 1-SATA of the SATA type is connected, the contacts C31, C29, C37, C35, C19, C17, C25, C23, C7, C5, C13, C11, C55, and C53 are terminals that are not used by the host apparatus 101. The pins P5, P7, P11, P13, P17, P19, P23, P25, P29, P31, P35, P37, P53, and P55 of the connector 2 each are left in a non-connected open state (N.C. (Non Connected)).

Figure 3:
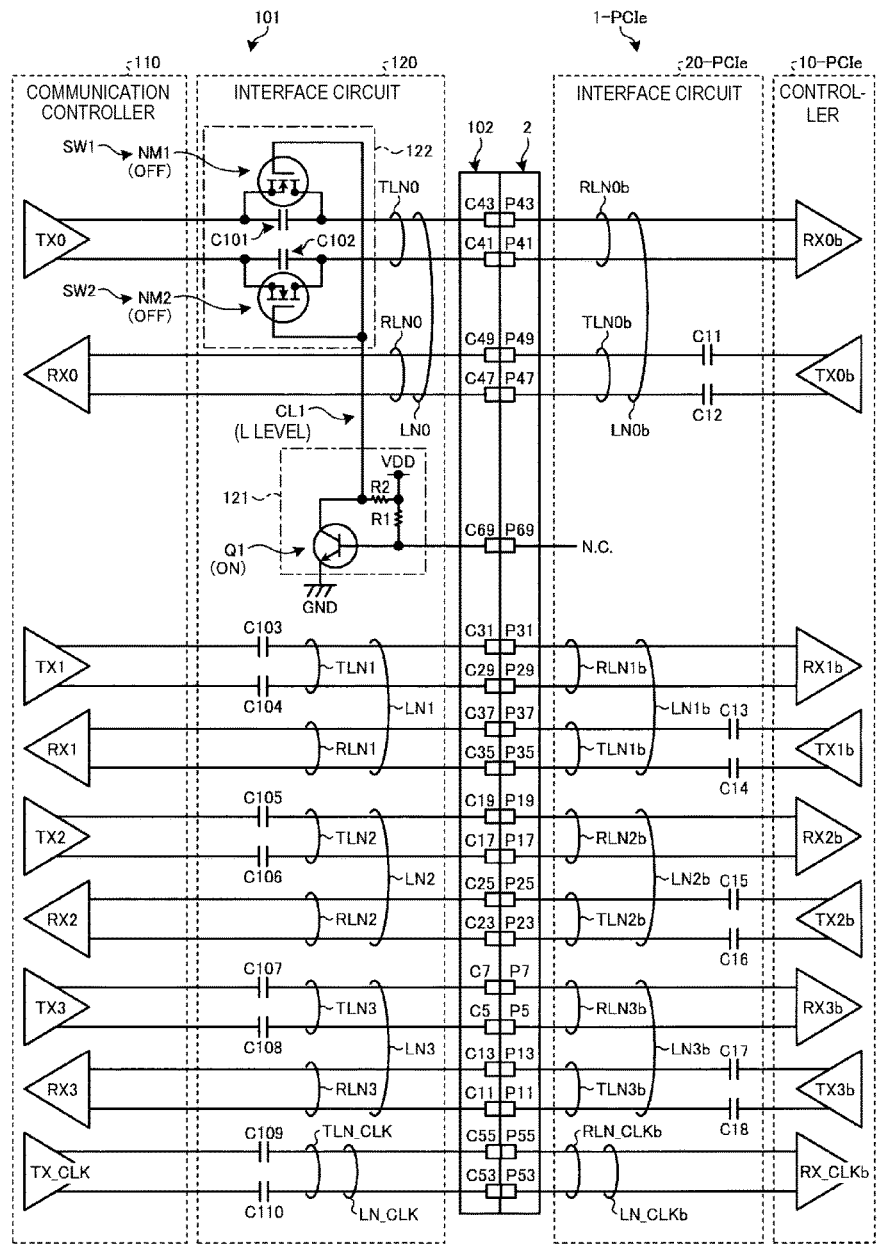
FIG. 3 illustrates configurations of a connector and an interface circuit of the host apparatus according to the embodiment and a connector and an interface circuit of a device when the device is of the PCIe type.

FIG. 3 illustrates a device 1 that is connected to the host apparatus 101 and is a device 1-PCIe of the Peripheral Components Interconnect Express (PCIe) type. Specifically, FIG. 3 illustrates configurations of the connector 102 and the interface circuit 120 of the host apparatus 101 and the connector 2 and the interface circuit 20-PCIe of the device 1-PCIe. The device 1-PCIe of the PCIe type refers to a device which conforms to the PCIe standard, and thus to a device having an interface (a connector and an interface circuit) conforming to the PCIe standard.

FIG. 3 illustrates a state in which pins P43, P41, P49, P47, P69, P31, P29, P37, P35, P19, P17, P25, P23, P7, P5, P13, P11, P55, and P53 of the connector 2 of the device 1-PCIe are respectively connected to the corresponding contacts C43, C41, C49, C47, C69, C31, C29, C37, C35, C19, C17, C25, C23, C7, C5, C13, C11, C55, and C53 of the connector 102 of the host apparatus 101.

Each of the contacts C43, C41, C49, C47, and C69 functions as a terminal compatible with the PCIe standard. For example, the contacts C43 and C41 configure a differential pair at the transmitting side. The contact C43 functions as, for example, a PETp0 terminal, which is one of data terminals of the differential pair. The contact C41 functions as, for example, a PETn0 terminal, which is the other of data terminals of the differential pair. For example, the contacts C49 and C47 configure a differential pair at the receiving side. The contact C49 functions as, for example, a PERp0 terminal, which is one of data terminals of the differential pair. The contact C47 functions as, for example, a PERn0 terminal, which is the other of data terminals of the differential pair. For example, the contact C69 functions as a PEDET terminal used to recognize the type of an interface of a device connected to the host apparatus 101. In a case where the device 1-PCIe of the PCIe type is connected to the host apparatus 101 and the pin P69 of the connector 2 in the interface circuit 20-PCIe of the device 1-PCIe is set to a non-connected open state (N.C. (Non Connected)), the contact C69 has a high impedance.

Furthermore, each of the contacts C31, C29, C37, C35, C19, C17, C25, C23, C7, C5, C13, C11, C55, and C53 functions as a terminal compatible with the PCIe standard. For example, the contacts C31 and C29 configure a differential pair at the transmitting side. The contact C31 functions as, for example, a PETp1 terminal, which is one of data terminals of the differential pair. The contact C29 functions as, for example, a PETn1 terminal, which is the other of data terminals of the differential pair. For example, the contacts C37 and C35 configure a differential pair at the receiving side. The contact C37 functions as, for example, a PERp1 terminal, which is one of data terminals of the differential pair. The contact C35 functions as, for example, a PERn1 terminal, which is the other of data terminals of the differential pair.

For example, the contacts C19 and C17 configure a differential pair at the transmitting side. The contact C19 functions as, for example, a PETp2 terminal, which is one of data terminals of the differential pair. The contact C17 functions as, for example, a PETn2 terminal, which is the other of data terminals of the differential pair. For example, the contacts C25 and C23 configure a differential pair at the receiving side. The contact C25 functions as, for example, a PERp2 terminal, which is one of data terminals of the differential pair. The contact C23 functions as, for example, a PERn2 terminal, which is the other of data terminals of the differential pair.

For example, the contacts C7 and C5 configure a differential pair at the transmitting side. The contact C7 functions as, for example, a PETp3 terminal, which is one of data terminals of the differential pair. The contact C5 functions as, for example, a PETn3 terminal, which is the other of data terminals of the differential pair. For example, the contacts C13 and C11 configure a differential pair at the receiving side. The contact C13 functions as, for example, a PERp3 terminal, which is one of data terminals of the differential pair. The contact C11 functions as, for example, a PERn3 terminal, which is the other of data terminals of the differential pair.

For example, the contacts C55 and C53 configure a differential pair at the transmitting side. The contact C55 functions as, for example, a REFCLKp terminal, which is one of clock terminals of the differential pair. The contact C53 functions as, for example, a REFCLKn terminal, which is the other of clock terminals of the differential pair.

In the information processing system 200, a request may be received to change a device to be connected to a host apparatus from a device which conforms to one interface standard to a device which conforms to another interface standard. In this instance, if the host apparatus 101 is configured to conform to one interface standard, when instead of the device which conforms to one interface standard, the device that conforms to another interface standard is connected to the host apparatus 101, the host apparatus 101 may be not able to allow the device that conforms to another interface standard to be connected thereto.

Figure 4A:
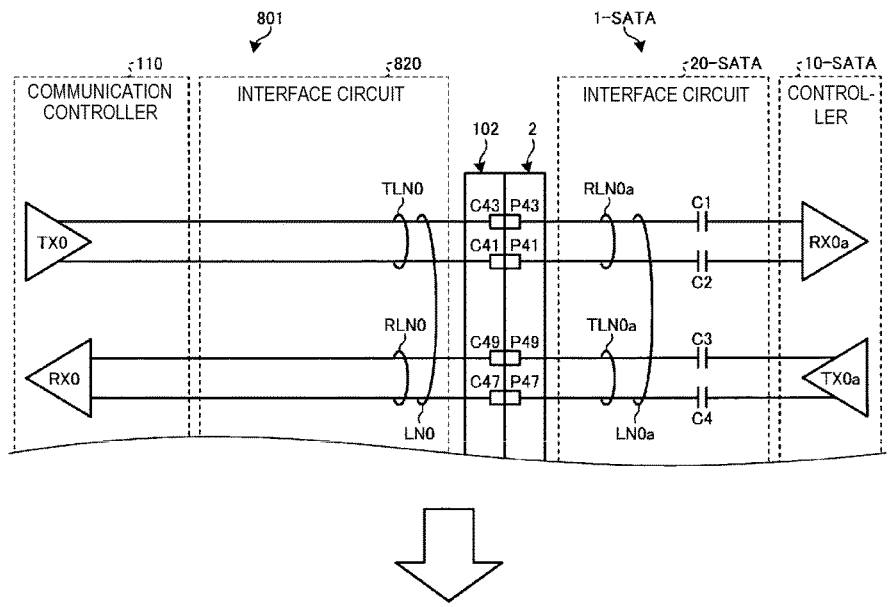
FIGS. 4A and 4B illustrate the connector and the interface circuit according to a first implementation example when the device of the PCIe type, instead of the SATA type, is connected to the host apparatus.

For example, an information processing system including a host apparatus 801 that is compatible with a device 1-SATA of the SATA type and the device 1-SATA of the SATA type is illustrated in FIG. 4A as a first implementation example. The SATA standard (or the SATA Express standard) recommends a configuration in which AC coupling capacitors are inserted at the side of the device 1-SATA.

According to the recommendation by the SATA standard (or the SATA Express standard), as illustrated in FIG. 4A, in the host apparatus 801, no AC coupling capacitor is disposed on a transmitting lane TLN0 and a receiving lane RLN0 of the communication lane LN0 in an interface circuit 820 located between the connector 102 and the communication controller 110. On the other hand, in the device 1-SATA of the SATA type, AC coupling capacitors C1, C2, C3, and C4 are disposed on a receiving lane RLN0a and a transmitting lane TLN0a of the communication lane LN0a in the interface circuit 20-SATA located between the connector 2 and the controller 10-SATA.

Here, each of the AC coupling capacitors C1 to C4 illustrated in FIG. 4A has a capacitance value Csata that conforms to the SATA standard (or the SATA Express standard). The capacitance value Csata is, for example, a value of 12 nanofarads (nF) or less, which corresponds to the band of signals transmitted and received by the SATA standard.

The receiving lane RLN0a is configured, for example, so as to connect the pins P43 and P41 of the connector 2 to the receiver RX0a of the controller 10-SATA in a differential manner. The AC coupling capacitor C1 is inserted on the P-side receiving path in the receiving lane RLN0a, and the AC coupling capacitor C2 is inserted on the N-side receiving path in the receiving lane RLN0a. The AC coupling capacitor C1 has, for example, one end electrically connected to the pin P43 of the connector 2 and the other end electrically connected to the receiver RX0a of the controller 10-SATA. The AC coupling capacitor C2 has, for example, one end electrically connected to the pin P41 of the connector 2 and the other end electrically connected to the receiver RX0a of the controller 10-SATA.

The transmitting lane TLN0a is configured in a differential manner. The AC coupling capacitor C3 is inserted on the P-side transmitting path in the transmitting lane TLN0a. The AC coupling capacitor C4 is inserted on the N-side transmitting path in the transmitting lane TLN0a. The AC coupling capacitor C3 has, for example, one end electrically connected to the pin P49 of the connector 2 and the other end electrically connected to the driver TX0a of the controller 10-SATA. The AC coupling capacitor C4 has, for example, one end electrically connected to the pin P47 of the connector 2 and the other end electrically connected to the driver TX0a of the controller 10-SATA.

Figure 4B:
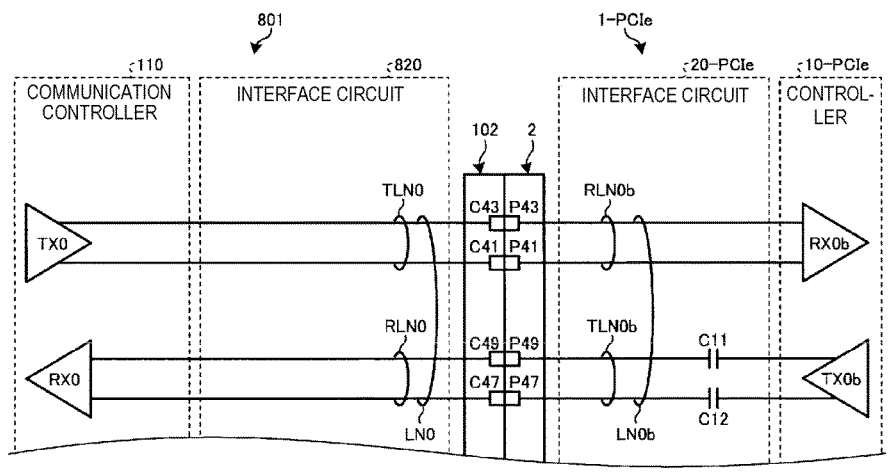

Here, it is assumed that for the purpose of enhancing the performance of, for example, data transfer in the information processing system 200, instead of the device 1-SATA of the SATA type, the device 1-PCIe of the PCIe type is connected to the host apparatus 801 as illustrated in FIG. 4B.

For example, while in the device 1-SATA of the SATA type, the number of communication lanes for data transmission and reception is 1 (for example, one communication lane LN0a illustrated in FIG. 2), the number of communication lanes for data transmission and reception is 4 (for example, four communication lanes LN0b, LN1b, LN2b, and LN3b illustrated in FIG. 3) in the device 1-PCIe of the PCIe type.

The PCIe standard recommends a configuration in which an AC coupling capacitor is disposed at the signal transmitting side. According to the recommendation by the PCIe standard, as illustrated in FIG. 4B, in the device 1-PCIe of the PCIe type, AC coupling capacitors C11 and C12 are disposed on a transmitting lane TLN0b of the communication lane LN0b for data in the interface circuit 20-PCIe located between the connector 2 and the controller 10-PCIe, but no AC coupling capacitor is disposed on the receiving lane RLN0b.

Here, each of the AC coupling capacitors C11 and C12 has a capacitance value Cpcie predetermined so that the device 1-PCIe of the PCIe type which conforms to the PCIe standard. The capacitance value Cpcie is, for example, a value in the range of 176 nF to 265 nF inclusive, which corresponds to the band of signals transmitted and received by the PCIe standard.

When, instead of the device 1-SATA of the SATA type, the device 1-PCIe of the PCIe type is connected to the host apparatus 101, as illustrated in FIG. 4B, no AC coupling capacitor is inserted on the transmission path leading from the driver TX0 to the receiver RX0a (in other words, the transmitting lane TLN0 and the receiving lane RLN0a). This makes the information processing system 200 which does not conform to the PCIe standard, which recommends an AC coupling capacitor having a capacitance value that corresponds to the band of signals transmitted and received prescribed by the PCIe standard (for example, a capacitance value in the range of 176 nF to 265 nF inclusive) on the transmitting lane TLN0. Therefore, since a signal still containing an offset component is transmitted, the levels of the signal (the potentials of the signal) may become unmatched between the signal transmitting side (the driver TX0 of the communication controller 110) and the signal receiving side (the receiver RX0a of the controller 10-PCIe). As a result, the information processing system 200 according to the first implementation example may not be able to correctly transmit a signal from the transmitting side (the communication controller 110) to the receiving side (the controller 10-PCIe), and the receiving side (the controller 10-PCIe) may not be able to correctly perform reception processing of the signal.

Figure 5A:
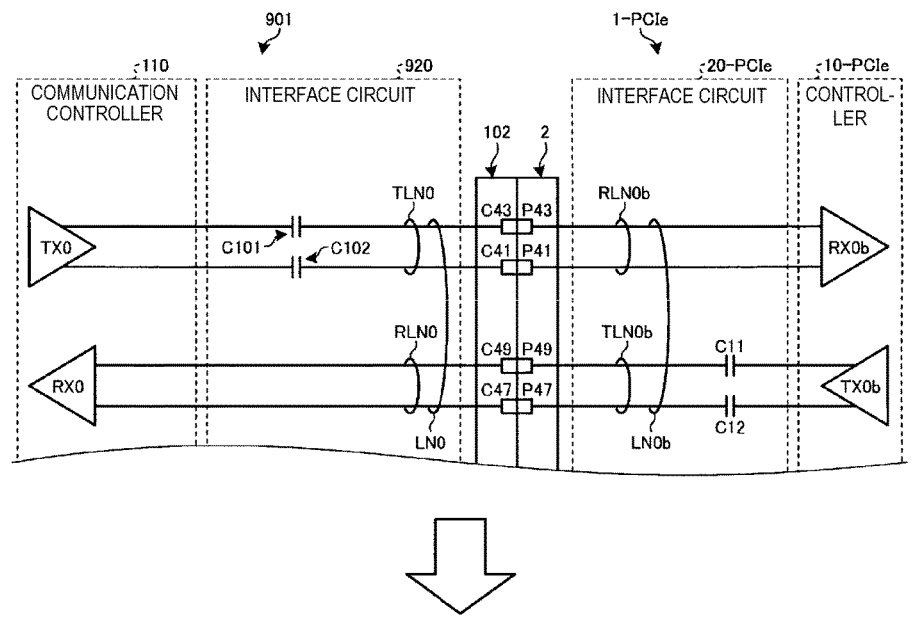
FIGS. 5A and 5B illustrate the connector and the interface circuit according to a second implementation example when the device of the SATA type, instead of the PCIe type, is connected to the host apparatus.

An information processing system including a host apparatus 901, which is configured to be compatible with a device 1-PCIe of the PCIe type and the device 1-PCIe of the PCIe type is illustrated in FIG. 5A as a second implementation example. The PCIe standard recommends a configuration in which AC coupling capacitors are disposed at the signal transmitting side.

According to the recommendation by the PCIe standard, as illustrated in FIG. 5A, in the host apparatus 901, AC coupling capacitors C101 and C102 are disposed on a transmitting lane TLN0 of the communication lane LN0 for data transmission and reception in an interface circuit 920, but no AC coupling capacitor is disposed on a receiving lane RLN0. On the other hand, in the device 1-PCIe of the PCIe type, no AC coupling capacitor is disposed on a receiving lane RLN0b of the communication lane LN0b in the interface circuit 20-PCIe located between the connector 2 and the controller 10-PCIe, but AC coupling capacitors C11 and C12 are disposed on a transmitting lane TLN0b.

Here, the AC coupling capacitors C11, C12, C101, and C102 each have a capacitance value Cpcie so that the device 1-PCIe of the PCIe type which conforms to the PCIe standard. The capacitance value Cpcie is, for example, a value in the range of 176 nF to 265 nF inclusive, which corresponds to the band of signals transmitted and received by the PCIe standard.

Figure 5B:
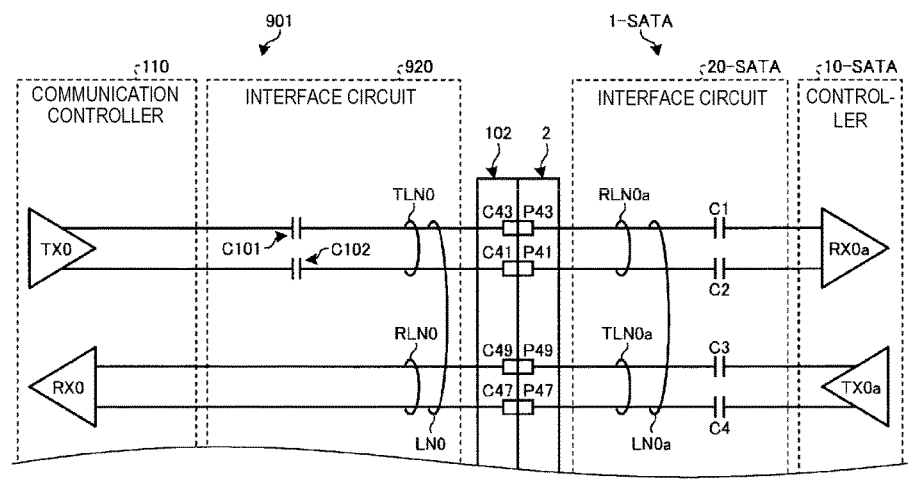

Here, it is assumed that, in the information processing system 200, as illustrated in FIGS. 5A and 5B, instead of the device 1-PCIe of the PCIe type, the device 1-SATA of the SATA type is connected to the host apparatus 901.

However, the SATA standard (or the SATA Express standard) recommends a configuration in which AC coupling capacitors are disposed at the side of the device 1-SATA. According to the recommendation by the SATA standard (or the SATA Express standard), as illustrated in FIG. 5B, in the device 1-SATA, AC coupling capacitors C1, C2, C3, and C4 are disposed on a receiving lane RLN0a and a transmitting lane TLN0a of the communication lane LN0a in the interface circuit 20-SATA located between the connector 2 and the controller 10-SATA.

Here, each of the AC coupling capacitors C1 to C4 has a capacitance value Csata that conforms to the SATA standard (or the SATA Express standard). The capacitance value Csata is, for example, a value of 12 nF or less, which correspond to the band of signals transmitted and received by the SATA standard.

Therefore, in the information processing system 200, when, instead of the device 1-PCIe of the PCIe type, the device 1-SATA of the SATA type is connected to the host apparatus 901, both the AC coupling capacitors C101 and C102 each having the capacitance value Cpcie and the AC coupling capacitors C1 and C2 each having the capacitance value Csata are disposed on the transmitting lane TLN0 and the receiving lane RLN0b leading from the driver TX0 of the communication controller 110 to the controller 10-PCIe. With this, a composite capacitance value of the AC coupling capacitors C101, C102, C1 and C2 on the transmitting lane TLN0 and the receiving lane RLN0b is likely to be not matched with the band of signals transmitted and received by the SATA standard. For example, in the composite capacitance value of the AC coupling capacitors C101 and C1 (or C102 and C2)

$$(Csata \times Cpcie)/(Csata + Cpcie),$$

if a value of 12 nF or less is substituted for Csata and a value in the range of 176 nF to 265 nF inclusive is substituted for Cpcie, the composite capacitance value becomes lower than 12 nF. As a result, since, although the connection between the host apparatus 101 and the device 1-SATA falls within the SATA standard, the composite capacitance value is different from the value intended in the device 1-SATA, the second basic form may not be able to correctly transmit a signal from the transmitting side (the communication controller 110) to the receiving side (the controller 10-SATA).

According to the present embodiment, as illustrated in FIGS. 2 and 3, the interface circuit 120 of the host apparatus 101 switches between a connection state in which the AC coupling capacitors C101 and C102 are disposed on the transmitting lane TLN0 and a connection state in which the AC coupling capacitors C101 and C102 are bypassed, according to an interface standard of the device 1 connected to the host apparatus 101, so that the compliance with the SATA standard and the PCIe standard and the correct signal transmission can be attained.

More specifically, the interface circuit 120 turns into a first connection state in response to the device 1-SATA of the SATA type connected to the connector 102 and into a second connection state in response to the device 1-PCIe of the PCIe type connected to the connector 102. In the first connection state, the connector 102 and the driver TX0 are electrically connected to each other while bypassing the AC coupling capacitors C101 and C102. The first connection state can be regarded as a state in which the AC coupling capacitors C101 and C102 are bypassed and disabled between the communication controller 110 and the connector 102. In the second connection state, the AC coupling capacitors C101 and C102 are electrically connected between the connector 102 and the driver TX0. The second connection state can be regarded as a state in which the AC coupling capacitors C101 and C102 are inserted and enabled between the communication controller 110 and the connector 102.

For example, as illustrated in FIG. 2, in the interface circuit 20-SATA of the device 1-SATA of the SATA type, the pin P69 of the connector 2 is connected to the ground potential GND. When the device 1-SATA of the SATA type is connected to the connector 102, the potential of the contact C69 of the connector 102 becomes at an L level (first potential), which corresponds to the ground potential GND. Furthermore, as illustrated in FIG. 3, in the interface circuit 20-PCIe of the device 1-PCIe of the PCIe type, the pin P69 of the connector 2 is set to a non-connected open state (N.C. (Non Connected)). When the device 1-PCIe of the PCIe type is connected to the connector 102, the potential of the contact C69 of the connector 102 has a high impedance (second potential), which corresponds to the open state. In other words, the interface circuit 120 can recognize that the potential of the contact C69 is at the L level when the device 1-SATA of the SATA type is connected to the connector 102, and can recognize that the potential of the contact C69 has a high impedance when the device 1-PCIe of the PCIe type is connected to the connector 102.

In other words, when the device 1 is connected to the connector 102, the interface circuit 120 can recognize the potential of the contact C69 indicating whether the device 1 is the device 1-SATA of the SATA type or the device 1-PCIe of the PCIe type. Then, the interface circuit 120 turns into the first connection state when recognizing the potential of the contact C69 indicating that the device 1-SATA of the SATA type has been connected to the connector 102, and into the second connection state when recognizing the potential of the contact C69 indicating that the device 1-PCIe of the PCIe type has been connected to the connector 102. For example, the interface circuit 120 turns into the first connection state in response to the potential of the contact C69 being at the L level (the first potential), and into the second connection state in response to the potential of the contact C69 having a high impedance (the second potential).

More specifically, the interface circuit 120 includes a generation circuit 121 and a switching circuit 122.

The switching circuit 122 includes AC coupling capacitors C101 and C102 and switches SW1 and SW2. The AC coupling capacitor C101 has one end electrically connected to the contact C43 of the connector 102 and the other end electrically connected to the output side of the driver TX0 of the communication controller 110. The switch SW1 has one end connected to the one end of the AC coupling capacitor C101 and the other end connected to the other end of the AC coupling capacitor C101. The AC coupling capacitor C102 has one end electrically connected to the contact C41 of the connector 102 and the other end electrically connected to the output side of the driver TX0 of the communication controller 110. The switch SW2 has one end connected to the one end of the AC coupling capacitor C102 and the other end connected to the other end of the AC coupling capacitor C102.

The generation circuit 121 generates a control signal having a level corresponding to the potential of the contact C69, and supplies the control signal to the switches SW1 and SW2. The switches SW1 and SW2 are turned on by the control signal of an H level and are turned off by the control signal of the L level. The control signal is active-high. The generation circuit 121 generates a control signal of the H level (a first level) in response to the potential of the contact C69 being at the L level (first potential), and generates a control signal of the L level (a second level) in response to the potential of the contact C69 having a high impedance (second potential). The generation circuit 121 supplies the generated control signal to the control terminals of the switches SW1 and SW2.

For example, the generation circuit 121 includes a resistor R1, a resistor R2, and a transistor Q1. The transistor Q1 is, for example, an NPN transistor, and includes a collector electrically connected to one end of the resistor R2 and electrically connected to the control terminals of the switches SW1 and SW2 via a signal line CL1, a base electrically connected to one end of the resistor R1 and the contact C69 of the connector 102, and an emitter electrically connected to the ground potential GND. The other end of the resistor R1 and the other end of the resistor R2 each are electrically connected to the power supply potential VDD.

When the potential of the contact C69 is at the L level, since the transistor Q1 is kept in an off-state (referring to FIG. 2), no current flows through the resistor R2 and a current flows from the power supply potential VDD to the resistor R1. As a result, a voltage at the resistor R1 drops, and the potential of the signal line CL1 becomes at the H level. Therefore, the control signal of the H level is supplied from the generation circuit 121 to the control terminals of the switches SW1 and SW2 via the signal line CL1, and the switches SW1 and SW2 are kept in an on-state. As a result, the switching circuit 122 turns into the first connection state.

When the potential of the contact C69 has a high impedance, since the transistor Q1 is kept in an on-state (referring to FIG. 3), no current flows through the resistor R1 and a current flows from the power supply potential VDD to the resistor R2 and the collector-emitter junction of the transistor Q1. As a result, a voltage at the resistor R2 drops, and the potential of the signal line CL1 becomes at the L level. Therefore, the control signal of the L level is supplied from the generation circuit 121 to the control terminals of the switches SW1 and SW2 via the signal line CL1, and the switches SW1 and SW2 are kept in an off-state (referring to FIG. 3). As a result, the switching circuit 122 turns into the second connection state.

For example, the switches SW1 and SW2 include NMOS transistors NM1 and NM2, respectively. The NMOS transistor NM1 includes a drain electrically connected to one end of the AC coupling capacitor C101 and the contact C43, a source electrically connected to the other end of the AC coupling capacitor C101 and the output side of the driver TX0, and a gate electrically connected to the generation circuit 121 via the signal line CL1. The NMOS transistor NM2 includes a drain electrically connected to one end of the AC coupling capacitor C102 and the contact C41, a source electrically connected to the other end of the AC coupling capacitor C102 and the output side of the driver TX0, and a gate electrically connected to the generation circuit 121 via the signal line CL1.

When the potential of the contact C69 is at the L level, the control signal of the H level is supplied from the generation circuit 121 to the gates of the NMOS transistors NM1 and NM2 via the signal line CL1, and the NMOS transistors NM1 and NM2 are kept in an on-state (referring to FIG. 2). As a result, the switching circuit 122 turns into the first connection state. When the potential of the contact C69 has a high impedance, the control signal of the L level is supplied from the generation circuit 121 to the gates of the NMOS transistors NM1 and NM2 via the signal line CL1, and the NMOS transistors NM1 and NM2 are kept in an off-state (referring to FIG. 3). As a result, the switching circuit 122 turns into the second connection state.

As described above, according to one embodiment, the interface circuit 120 of the host apparatus 101 switches between the second connection state, in which the AC coupling capacitors C101 and C102 exist on the transmitting lane TLN0 and the first connection state, in which the AC coupling capacitors C101 and C102 are bypassed, according to an interface standard of the device 1 connected to the host apparatus 101. For example, when the device 1-SATA of the SATA type has been connected to the connector 102, the interface circuit 120 turns into the first connection state in response to the potential of the contact C69 being at the L level. As a result, in both a case where, instead of the device 1-SATA of the SATA type, the device 1-PCIe of the PCIe type is connected to the connector 102 of the host apparatus 101 and a case where, instead of the device 1-PCIe of the PCIe type, the device 1-SATA of the SATA type is connected to the connector 102 of the host apparatus 101, the standard can be conformed to and the correct signal transmission from the transmitting side to the receiving side can be performed.

Figure 6:
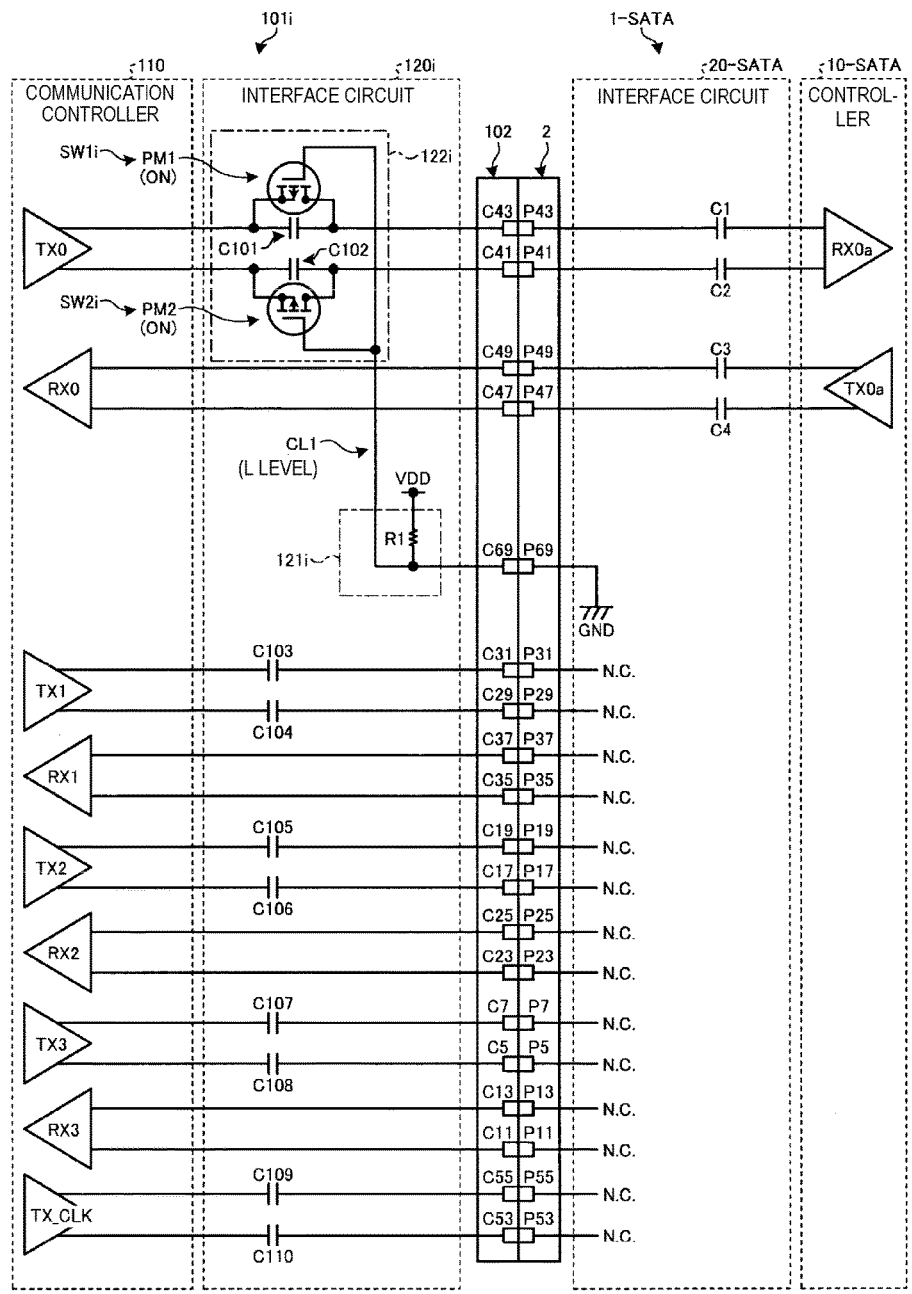
FIG. 6 illustrates a connector and an interface circuit according to a modification example of the embodiment when the device is of the SATA type.
Figure 7:
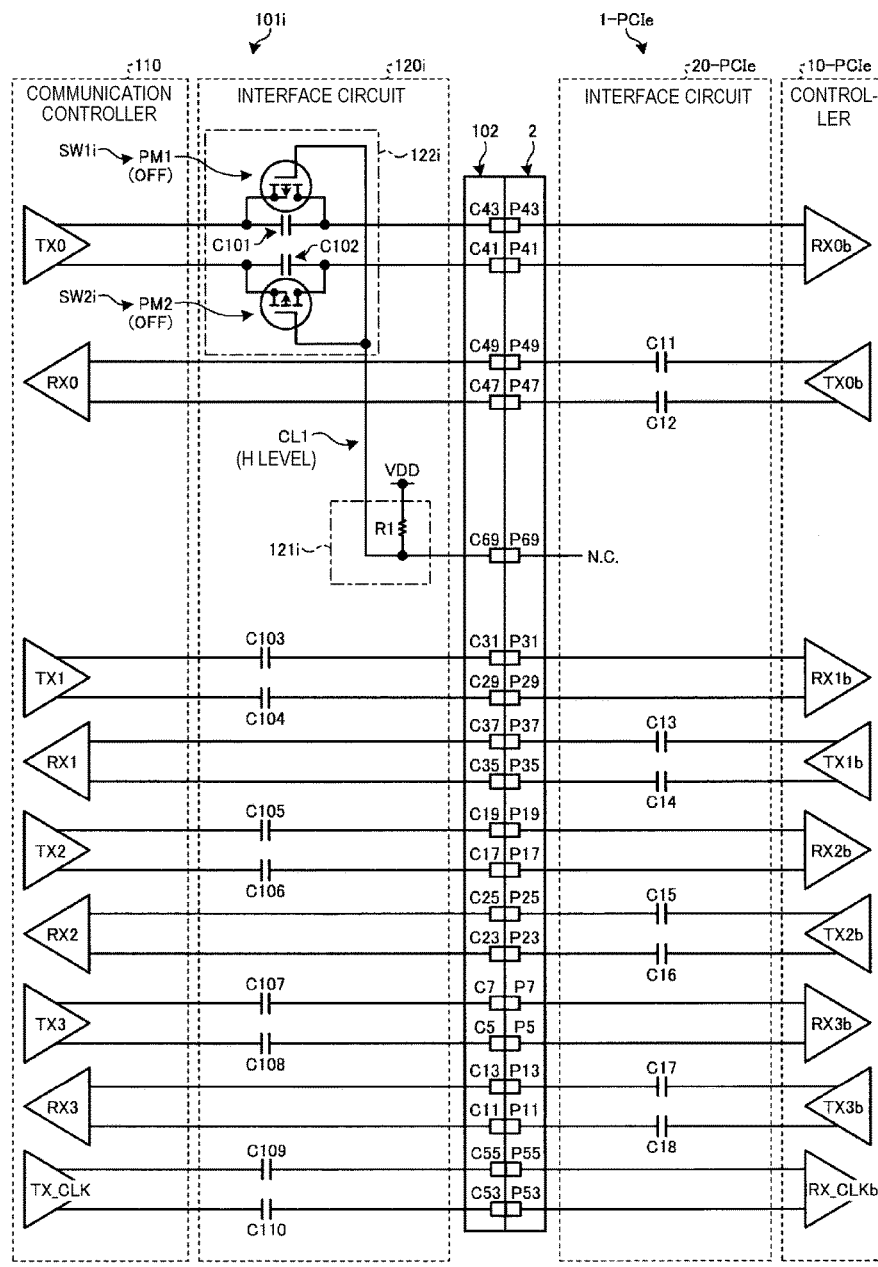
FIG. 7 illustrates a connector and an interface circuit according to the modification example of the embodiment when the device is of the PCIe type.

FIGS. 6 and 7 illustrate a connector and an interface circuit according to a modification example of the embodiment. FIG. 6 illustrates a case where a device of the SATA type is connected, and FIG. 7 illustrates a case where a device of the PCIe type is connected. As illustrated in FIGS. 6 and 7, switches SW1$i$ and SW2$i$, which are used to switch between the first connection state and the second connection state in an interface circuit 120$i$ of a host apparatus 101$i$, may be configured to be turned on by the control signal of the L level and be turned off by the control signal of the H level. FIG. 6 illustrates configurations of the connector 102 and the interface circuit 120$i$ of the host apparatus 101$i$ and the connector 2 and the interface circuit 20-SATA of the device 1-SATA of the SATA type. FIG. 7 illustrates configurations of the connector 102 and the interface circuit 120$i$ of the host apparatus 101$i$ and the connector 2 and the interface circuit 20-PCIe of the device 1-PCIe of the PCIe type.

For example, the interface circuit 120$i$ includes a generation circuit 121$i$ and a switching circuit 122$i$. The control signal, which is supplied from the generation circuit 121$i$ to the switching circuit 122$i$, is high-active. The generation circuit 121$i$ generates a control signal of the L level (a first level) in response to the potential of the contact C69 being at the L level (first potential), and generates a control signal of the H level (a second level) in response to the potential of the contact C69 having a high impedance (second potential).

For example, the generation circuit 121$i$ has a configuration without the resistor R2 and the transistor Q1 in the generation circuit 121 (referring to FIGS. 2 and 3). The resistor R1 has one end electrically connected to the contact C69 of the connector 102 and the other end electrically connected to the power supply potential VDD.

When the potential of the contact C69 is at the L level, since a current flows from the power supply potential VDD to the resistor R1, voltage at the resistor R1 drops, and the potential of the signal line CL1 becomes at the L level. Therefore, the control signal of the L level is supplied from the generation circuit 121$i$ to the control terminals of the switches SW1$i$ and SW2$i$ via the signal line CL1, and the switches SW1$i$ and SW2$i$ are kept in an on-state (referring to FIG. 6). As a result, the switching circuit 122$i$ turns into the first connection state, in which the AC coupling capacitors C101 and C102 are bypassed.

When the potential of the contact C69 has a high impedance, no current flows through the resistor R1, and the potential of the signal line CL1 is pulled up by the resistor R1 to the H level corresponding to the power supply potential VDD. Therefore, the control signal of the H level is supplied from the generation circuit 121$i$ to the control terminals of the switches SW1$i$ and SW2$i$ via the signal line CL1, and the switches SW1$i$ and SW2$i$ are kept in an off-state (referring to FIG. 7). As a result, the switching circuit 122$i$ turns into the second connection state, in which the AC coupling capacitors C101 and C102 exist between the communication controller 110 and the connector 102.

For example, the switches SW1$i$ and SW2$i$ include PMOS transistors PM1 and PM2, respectively. The PMOS transistor PM1 includes a source electrically connected to one end of the AC coupling capacitor C101 and the contact C43, a drain electrically connected to the other end of the AC coupling capacitor C101 and the output side of the driver TX0, and a gate electrically connected to the generation circuit 121$i$ via the signal line CL1. The PMOS transistor PM2 includes a source electrically connected to one end of the AC coupling capacitor C102 and the contact C41, a drain electrically connected to the other end of the AC coupling capacitor C102 and the output side of the driver TX0, and a gate electrically connected to the generation circuit 121$i$ via the signal line CL1.

When the potential of the contact C69 is at the L level, the control signal of the L level is supplied from the generation circuit 121$i$ to the gates of the PMOS transistors PM1 and PM2 via the signal line CL1, and the PMOS transistors PM1 and PM2 are kept in an on-state (referring to FIG. 6). As a result, the switching circuit 122$i$ turns into the first connection state. When the potential of the contact C69 has a high impedance, the control signal of the H level is supplied from the generation circuit 121$i$ to the gates of the PMOS transistors PM1 and PM2 via the signal line CL1, and the PMOS transistors PM1 and PM2 are kept in an off-state (referring to FIG. 7). As a result, the switching circuit 122$i$ turns into the second connection state. Accordingly, in both a case where, instead of the device 1-SATA of the SATA type, the device 1-PCIe of the PCIe type is connected to the connector 102 of the host apparatus 101 and a case where, instead of the device 1-PCIe of the PCIe type, the device 1-SATA of the SATA type is connected to the connector 102 of the host apparatus 101, the standard can be conformed to and the correct signal transmission from the transmitting side to the receiving side can be performed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An interface comprising:
   a connector that is physically and electrically connectable to a device conforming to a first interface standard and a device conforming to a second interface standard; and
   an interface circuit including a signal line extending to a terminal of the connector, a coupling capacitor disposed on the signal line, and a switch having a first end electrically connected to a first terminal of the coupling capacitor and a second end electrically connected to a second terminal of the coupling capacitor, wherein
   the switch is turned on when the connector is connected to a device conforming to the first interface standard so that a signal bypasses the coupling capacitor and is transmitted through the switch and turned off when the connector is connected to a device conforming to the second interface standard so that the signal is transmitted through the coupling capacitor, and
   the connector includes a second terminal positioned on the connector to be in electrical contact with a ground terminal of the device conforming to the first interface standard when the device conforming to the first interface standard is physically and electrically connected to the connector, and to be in an open state when the device conforming to the second interface standard is physically and electrically connected to the connector, a potential of the second terminal of the connector controlling an on/off state of the switch.

2. The interface according to claim 1, wherein the interface circuit further includes
   a transistor having a control electrode electrically connected to the second terminal of the connector, a first channel electrode electrically connected to a switching terminal of the switch, and a second channel electrode electrically connected to ground,
   a first resistor electrically connected between a power supply terminal and the control electrode of the transistor, and
   a second resistor electrically connected between the power supply terminal and the first channel electrode of the transistor.

3. The interface according to claim 1, wherein
   the second terminal of the connector is electrically connected to a switching electrode of the switch, and
   the interface circuit further includes a resistor connected between a power supply terminal and the second terminal of the connector.

4. The interface according to claim 1, wherein the signal line is one of a pair of differential signal lines.

5. The interface according to claim 4, wherein
   the interface circuit further includes a second coupling capacitor disposed on the other of the pair of differential signal lines and a second switch having a first end electrically connected to a first terminal of the second coupling capacitor and a second end electrically connected to a second terminal of the second coupling capacitor, and
   the second switch is turned on when the connector is connected to the device conforming to the first interface standard so that a second signal bypasses the second coupling capacitor and is transmitted through the second switch and turned off when the connector is connected to the device conforming to the second interface standard so that the second signal is transmitted through the second coupling capacitor.

6. The interface according to claim 1, wherein
   the first interface standard is SATA, and the second interface standard is PCIe.

7. The interface according to claim 1, wherein
   the switch comprises a NMOS transistor or a PMOS transistor.

8. A computing device comprising:
   a communication controller;
   an interface; and
   a processor configured to control the communication controller to output data through the interface, wherein the interface includes
   a connector that is physically and electrically connectable to a device conforming to a first interface standard and a device conforming to a second interface standard; and
   an interface circuit including a signal line extending to a terminal of the connector, a coupling capacitor disposed on the signal line, and a switch having a first end electrically connected to a first terminal of the coupling capacitor and a second end electrically connected to a second terminal of the coupling capacitor, wherein
   the switch is turned on when the connector is connected to a device conforming to the first interface standard so that a signal bypasses the coupling capacitor and is transmitted through the switch and turned off when the connector is connected to a device conforming to the second interface standard so that the signal is transmitted through the coupling capacitor, and
   the connector includes a second terminal positioned on the connector to be in electrical contact with a ground terminal of the device conforming to the first interface standard when the device conforming to the first interface standard is physically and electrically connected to the connector, and to be in an open state when the device conforming to the second interface standard is physically and electrically connected to the connector, a potential of the second terminal of the connector controlling an on/off state of the switch.

9. The computing device according to claim 8, wherein the interface circuit further includes
   a transistor having a control electrode electrically connected to the second terminal of the connector, a first channel electrode electrically connected to a switching terminal of the switch, and a second channel electrode electrically connected to ground,
   a first resistor electrically connected between a power supply terminal and the control electrode of the transistor, and
   a second resistor electrically connected between the power supply terminal and the first channel electrode of the transistor.

10. The computing device according to claim 8, wherein
    the second terminal of the connector is electrically connected to a switching electrode of the switch, and the interface circuit further includes a resistor connected between a power supply terminal and the second terminal of the connector.

11. The computing device according to claim 8, wherein the signal line is one of a pair of differential signal lines.

12. The computing device according to claim 11, wherein the interface circuit further includes a second coupling capacitor disposed on the other of the pair of differential signal lines and a second switch having a first end electrically connected to a first terminal of the second coupling capacitor and a second end electrically connected to a second terminal of the second coupling capacitor, and the second switch is turned on when the connector is connected to the device conforming to the first interface standard so that a second signal bypasses the second coupling capacitor and is transmitted through the second switch and turned off when the connector is connected to the device conforming to the second interface standard so that the second signal is transmitted through the second coupling capacitor.

13. The computing device according to claim 8, wherein the first interface standard is SATA, and the second interface standard is PCIe.

14. The computing device according to claim 8, wherein the switch comprises a NMOS transistor or a PMOS transistor.

15. An interface comprising:

a connector that is physically and electrically connectable to a device conforming to a first interface standard and a device conforming to a second interface standard; and an interface circuit including:

a pair of differential signal lines consisting of first and second signal lines extending to first and second terminals of the connector, respectively;

a first coupling capacitor disposed on the first signal line;

a first switch having a first end electrically connected to a first terminal of the first coupling capacitor and a second end electrically connected to a second terminal of the first coupling capacitor;

a second coupling capacitor disposed on the second signal line; and a second switch having a first end electrically connected to a first terminal of the second coupling capacitor and a second end electrically connected to a second terminal of the second coupling capacitor, wherein the first switch is turned on when the connector is connected to a device conforming to the first interface standard so that a first signal bypasses the first coupling capacitor and is transmitted through the first switch and turned off when the connector is connected to a device conforming to the second interface standard so that the first signal is transmitted through the first coupling capacitor, and the second switch is turned on when the connector is connected to the device conforming to the first interface standard so that a second signal bypasses the second coupling capacitor and is transmitted through the second switch and turned off when the connector is connected to the device conforming to the second interface standard so that the second signal is transmitted through the second coupling capacitor.

16. The interface according to claim 15, wherein the connector includes a third terminal, a potential of the third terminal controlling the on/off state of at least one of the first and second switches.

17. The interface according to claim 16, wherein the third terminal is positioned on the connector to be in electrical contact with a ground terminal of the device conforming to the first interface standard when the device conforming to the first interface standard is physically and electrically connected to the connector, and to be in an open state when the device conforming to the second interface standard is physically and electrically connected to the connector.

18. The interface according to claim 17, wherein the interface circuit further includes a transistor having a control electrode electrically connected to the third terminal of the connector, a first channel electrode electrically connected to a switching terminal of the first switch, and a second channel electrode electrically connected to ground, a first resistor electrically connected between a power supply terminal and the control electrode of the transistor, and a second resistor electrically connected between the power supply terminal and the first channel electrode of the transistor.

19. The interface according to claim 17, wherein the third terminal of the connector is electrically connected to a switching electrode of the first switch, and the interface circuit further includes a resistor connected between a power supply terminal and the third terminal.

20. The interface according to claim 15, wherein the first interface standard is SATA, and the second interface standard is PCIe.

* * * * *